US009690844B2

(12) United States Patent
Mukherjee et al.

(10) Patent No.: US 9,690,844 B2
(45) Date of Patent: Jun. 27, 2017

(54) METHODS AND SYSTEMS FOR CUSTOMIZABLE CLUSTERING OF SUB-NETWORKS FOR BIOINFORMATICS AND HEALTH CARE APPLICATIONS

(71) Applicant: Samsung Electronics Co., Ltd., Suwon-si, Gyeonggi-do (KR)

(72) Inventors: Subhankar Mukherjee, Bangalore (IN); Taejin Ahn, Suwon-si (KR); Ajit S. Bopardikar, Bangalore (IN); Anirban Bhaduri, Bangalore (IN); Srikanth Rama Mallavarapu, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 341 days.

(21) Appl. No.: 14/604,433

(22) Filed: Jan. 23, 2015

(65) Prior Publication Data
US 2015/0213115 A1     Jul. 30, 2015

(30) Foreign Application Priority Data

Jan. 24, 2014   (IN) ............................. 310/CHE/2014
Jan. 13, 2015   (KR) ........................ 10-2015-0006118

(51) Int. Cl.
    *G06F 17/30*      (2006.01)
(52) U.S. Cl.
    CPC ............................. *G06F 17/30601* (2013.01)
(58) Field of Classification Search
    None
    See application file for complete search history.

(56) References Cited

U.S. PATENT DOCUMENTS

| 7,363,281 | B2 | 4/2008 | Jin et al. | |
|---|---|---|---|---|
| 7,933,915 | B2 * | 4/2011 | Singh | G06F 17/30958 707/760 |
| 7,945,668 | B1 * | 5/2011 | Nucci | G06K 9/622 707/999.001 |
| 8,606,787 | B1 * | 12/2013 | Asgekar | G06Q 50/01 707/737 |

(Continued)

FOREIGN PATENT DOCUMENTS

KR     2005-0063617 A     6/2005

*Primary Examiner* — Hung Le
(74) *Attorney, Agent, or Firm* — Leydig, Voit & Mayer, Ltd.

(57) ABSTRACT

Methods and devices for clustering a plurality of sub-networks of a larger interaction network using an enhanced hierarchical clustering algorithm are disclosed. The methods provide expression based sub-network generation using differentially expressed markers. The enhanced hierarchical clustering algorithm clusters the generated sub-networks based on a user defined customizable similarity coefficient. The methods use non-Boolean links to cluster similar sub-networks. This provides consideration of indirect relationships among sub-networks. The customizable similarity coefficient enables the methods to be used for diverse applications such as biomarker detection, patient stratification, personalized therapy, drug efficacy prediction, genetic similarity analysis in genetic diseases. The methods enable patient grouping based on the enhanced hierarchical clustering algorithm.

19 Claims, 8 Drawing Sheets

(56) References Cited

U.S. PATENT DOCUMENTS

| | | | |
|---|---|---|---|
| 2004/0059830 A1* | 3/2004 | Brown | H04L 41/0893 709/238 |
| 2006/0045135 A1* | 3/2006 | Hetzel | H04L 12/6418 370/503 |
| 2007/0239694 A1* | 10/2007 | Singh | G06F 17/30958 |
| 2007/0248977 A1 | 10/2007 | Maruhashi et al. | |
| 2008/0133197 A1 | 6/2008 | Bang et al. | |
| 2011/0173189 A1* | 7/2011 | Singh | G06F 17/30958 707/722 |
| 2011/0188378 A1* | 8/2011 | Collins | H04L 41/042 370/236 |
| 2013/0124524 A1* | 5/2013 | Anderson | G06F 17/30286 707/737 |

* cited by examiner

| Input Marker set | Accuracy (Benchmark - existing method) | Accuracy (using the method) |
|---|---|---|
| 108 | 74% | 82.3% |
| 51 | 69.5% | 82.3% |

METHODS AND SYSTEMS FOR CUSTOMIZABLE CLUSTERING OF SUB-NETWORKS FOR BIOINFORMATICS AND HEALTH CARE APPLICATIONS

CROSS-REFERENCE TO RELATED APPLICATION

This application claims priority from Indian Patent Application No. 310/CHE/2014, filed on 24 Jan. 2014 in the Indian Intellectual Property Office and Korean Patent Application No. 10-2015-0006118, filed on 13 Jan. 2015 in the Korean Intellectual Property Office, the disclosure of each of which is incorporated herein by reference in its entirety.

BACKGROUND

1. Field

The present disclosure relates to the fields of bioinformatics and health care and more particularly relates to clustering of sub-networks of a network based on a user customizable similarity coefficient, for bioinformatics and healthcare applications.

2. Description of Related Art

Recent progress in medical science, bioinformatics and biotechnology has led to the accumulation of tremendous amounts of biological data such as gene expression data. Analysis and interpretation of this massive data is a challenging task. Moreover, with the advent of microarrays and next-generation biotechnological methods, the use of a large amount of gene expression data has become ubiquitous in biological research. For example, the large amount of gene expression data can be used to generate various biological networks such as a gene interaction network or a protein interaction network. Various bioinformatics studies propose to analyze the gene expression data at a group-level of functionally related genes such as pathways or sub-networks.

However, generating optimized sub-networks for better and more accurate analysis remains a challenging task. Some existing conventional methods generate sub-networks based on algorithms that grow seeds (initial sub-networks) using term enrichment test and scoring functions. Some existing sub-network generation algorithms grow the seeds by merging of generated small size sub-networks based on some pre-defined neighboring criteria. There are situations when a scoring function returns no gain or when genes around the seed fail to satisfy the neighborhood criteria. In such situations, the resulting sub-networks are very small in size. Generating, very small sub-networks terminates the sub-network generation process resulting in a plurality of sub-networks that may not have any significance with respect to a particular desired similarity between them.

Parallel progress in data mining research provides efficient and scalable methods such as clustering, pattern analysis for mining interesting patterns and knowledge in large databases. Data mining techniques such as clustering can provide effective analysis of the gene expression data for various bioinformatics and health care applications. Clustering divides data of interest into a small number of relatively homogeneous groups. Clustering can be an effective tool in analysis of the gene expression data at the sub-network level.

Hierarchical clustering algorithms are a popular choice for a clustering approach that determines successive clusters using prior-established seed clusters. Conventional hierarchical clustering algorithms use distance metrics as criteria for clustering. These hierarchical clustering algorithms based on distance metrics are better applicable and provide reliable results for mostly numeric data.

Another existing hierarchical clustering algorithm for Boolean and Categorical data utilizes links instead of distance metrics as clustering criteria. The links captures the neighbourhood-related information of the data. The higher the number of links, the higher is the similarity between the data being compared. The link refers only to direct links (i.e., a direct relation) existing between two data items or data sets being compared. The existing method fails to consider indirect links between the data being compared, thus, maintaining a rigid approach for clustering. However, many bioinformatics, health care and non-biological applications can provide effective analysis if the indirect relation between the data analyzed is provided considerable weighting. However, the weighting required to be provided to indirect relationship may vary based on the end application. Thus, flexibility in defining clustering criteria, to be better suitable for the particular application, will be appreciated.

SUMMARY

Accordingly the present embodiments provide a method for clustering a plurality of sub-networks derived from a larger network. Further the method comprises receiving, in a computing device, a data set representing a plurality of sub-networks derived from a network. Further the method comprises selecting sub networks among the plurality of sub-networks. Further the method comprises building a plurality of local heaps for each cluster among a plurality of clusters. The plurality of local heaps are built by computing a link between the each cluster and remaining clusters of the plurality of clusters. The plurality of clusters corresponds to a plurality of selected sub-networks among the plurality of sub-networks. The method further comprises building a global heap by computing the link between the each cluster among the plurality of clusters and a highest ranked cluster of each the local heap among the plurality of local heaps. Further, the method comprises merging the highest ranked cluster of the each local heap and a highest ranked cluster of the global heap to form plurality of intermediate clusters. Furthermore, the method comprises calculating similarity coefficients between each intermediate cluster among the plurality of intermediate clusters and each cluster in the global heap, each cluster in corresponding the each local heap. Furthermore, the method comprises returning the each intermediate cluster as a final cluster, if each the calculated similarity coefficients is below a predefined link cutoff value.

Accordingly the present embodiments provide a device for clustering a plurality of sub-networks derived from a larger network using an enhanced hierarchical clustering algorithm. The device comprises an integrated circuit which further comprises at least one processor; at least one memory having a computer program code within circuit. Further the at least one memory and the computer program code with the at least one processor cause the device to receive a data set representing a plurality of sub-networks derived from a network. Further the at least one memory and the computer program code with the at least one processor cause the device to select sub networks among the plurality of sub-networks. Further the at least one memory and the computer program code with the at least one processor cause the device to build a plurality of local heaps for each cluster among a plurality of clusters. Further, the device is configured to build the plurality of local heaps by computing link between the each cluster and remaining clusters of the plurality of clusters. The plurality of clusters corresponds to plurality of selected sub-networks among the plurality of sub-networks. Further, the device is configured to build a global heap by computing the link between the each cluster among the plurality of clusters and a highest ranked cluster of each the local heap among the plurality of local heaps. Thereafter, the device is configured to merge the highest ranked cluster of the each local heap and a highest ranked cluster of the global heap to form a plurality of intermediate clusters. Furthermore, the device is configured to calculate a similarity coefficient between each intermediate cluster among the plurality of intermediate clusters and each cluster in the global heap, each cluster in corresponding the each local heap. Furthermore, the device is configured to return the each intermediate cluster as a final cluster, if each the calculated link is below a predefined link cutoff value.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This disclosure is illustrated in the accompanying drawings, throughout which like reference letters indicate corresponding parts in the various figures. The embodiments herein will be better understood from the following description with reference to the drawings, in which.

DETAILED DESCRIPTION

Figure 1:
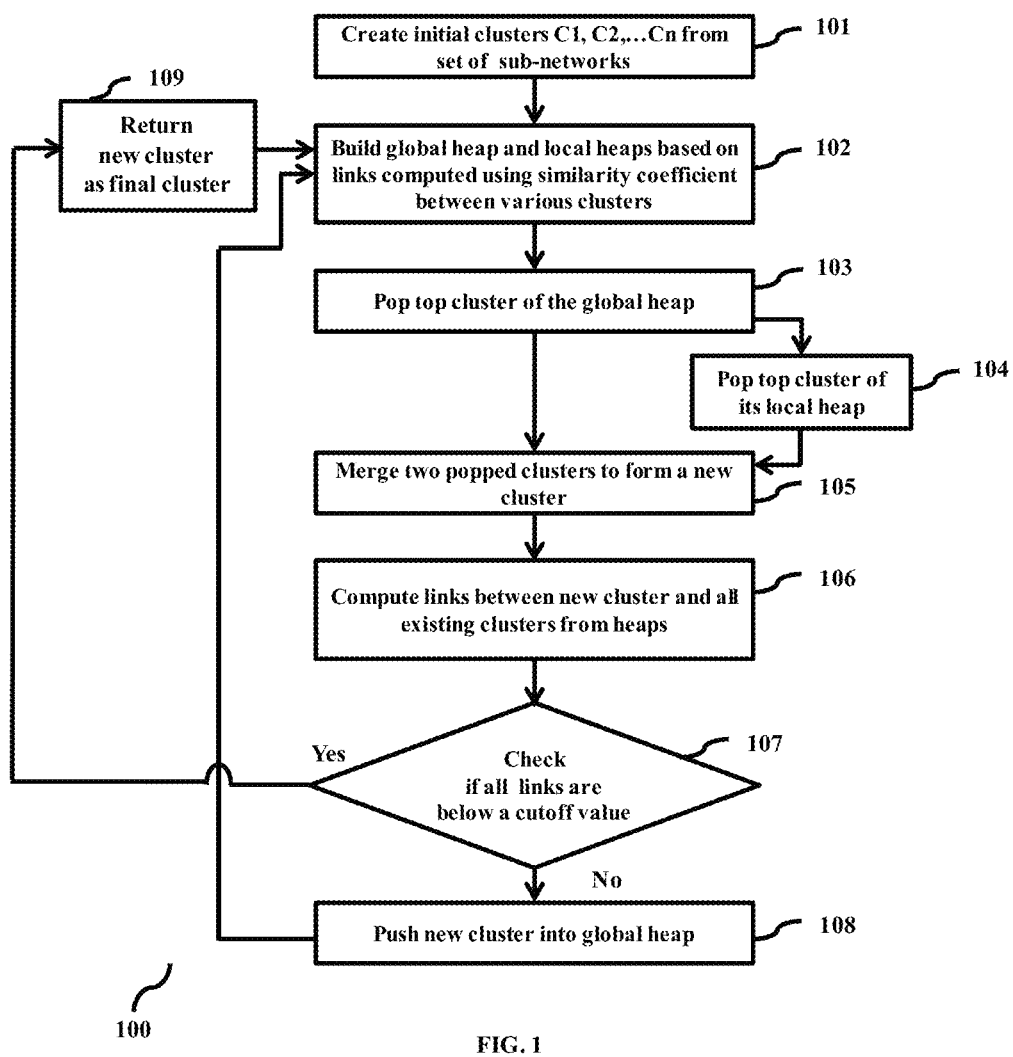
FIG. 1 illustrates a flow diagram explaining an enhanced hierarchical clustering algorithm for clustering plurality of sub-networks.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein provide methods and systems for clustering plurality of sub-networks in a larger network (network) using an enhanced hierarchical clustering algorithm. The enhanced clustering algorithm provides a user-defined customizable similarity coefficient for clustering a plurality of sub-networks. The customization enables flexibility in defining the clustering criteria so as to be better suitable for the particular end application such as data stratification, bio-marker detection and the like. The methods provide multiple levels of customization by enabling the user to pre-define the degree of similarity among the data items (entities) to be grouped within a single cluster. The methods also provide flexibility to select functional relationship quantifiers for computing the degree of similarity among the entities in terms of similarity coefficient.

In an embodiment, the various functional relationship quantifiers used to compute the similarity coefficient include but are not limited to a Common Neighborhood Interaction Coefficient (CNIC), an Edge Interaction Coefficient (EIC) and standard Jaccard Index. The EIC and the CNIC functional relationship quantifiers are described later in FIG. 1.

Thus, use of the quantified relationship among the sub-networks allows consideration of indirect functional relations among the sub-networks during clustering of the sub-networks.

The customization enables applying the enhanced hierarchical clustering algorithm for diverse applications in biological and non-biological fields. For better understanding of the embodiments, the enhanced clustering algorithm and its application are explained with example use cases from the field of bioinformatics and should not be considered as a limitation. The methods are equally applicable to various fields wherever the database information in the larger network can be used to generate plurality of sub-networks.

The bioinformatics and health care applications for which the present embodiments are particularly useful include but are not limited to biomarker detection (discovery), patient stratification, personalized therapy, drug efficacy prediction, genetic similarity analysis in genetic diseases and the like.

The method generates the sub-networks by expression based on growing of differentially expressed network entities. The network can be a biological network, a social network or the like that enables mapping relations between the entities of the network. For example, genes and people can be the entities of the biological network and the social network respectively, where these entities in the network are related to each other in one or more aspects. The relation among the entities can then be mapped, where the relation can be an influential relation, an interactive relation or can be mere connection-based relation. The biological networks for various bioinformatics and health care application include but are not limited to a gene interaction network, a protein-protein interaction network, metabolic pathways, gene regulatory networks, signaling pathways.

The presence of abnormalities in the expression of genes, both in temporal and level or amplitude of expression of particular genes, are one of the major causes of genetic diseases such as cancer in living organisms. The abnormalities refer to an over-expression or under-expression of the genes or markers as compared to a mean expression for the normal case for the respective gene/marker. Changes in expression variability called the differential marker expression relative to the expression of that marker in a normal (healthy) living being plays a major role in analysis of diseases. An example of the differential marker expression can be a measured value of amount of messenger RNA (mRNA) derived from microarray experiments which relates to the gene expression. Thus, generation of sub-networks using differentially expressed markers can provide a better biological insight. These sub-networks can be generated using various methods.

In an embodiment, the multiple sub-networks are obtained using the enhanced clustering algorithm.

The flexibility in defining the similarity coefficient enables the user to define the level (e.g., degree of similarity) of the indirect relationship to be considered. Thus, the defined level of indirect relationship in turn defines the weight to be given to a small world effect present in the gene interaction network.

The small world effect is a measure of the influence a gene has on its higher order neighbors in the gene interaction network. The higher order neighbors are the genes that do not have a direct relation with the gene but can be reached with one or more intermediate hops from the gene. It is observed that the influence the gene has on its higher order neighbors is insignificant and hence can be eliminated while generating the sub-network. Thus, the customizable similarity coefficient enables controlling the small world effect while generating sub-networks by clustering the differentially expressed genes to form a plurality of sub-networks.

Throughout the description the terms enhanced hierarchical clustering algorithm and clustering algorithm are used interchangeably.

Referring now to the drawings, and more particularly to FIGS. 1 through 8, where similar reference characters denote corresponding features consistently throughout the figures, there are shown certain embodiments.

FIG. 1 illustrates a flow diagram explaining the clustering algorithm for clustering a plurality of sub-networks, according to embodiments as disclosed herein.

Clustering of sub-networks enables grouping or classifying similar sub-networks in a single group. The user defined similarity coefficient enables defining the desired degree of similarity between sub-networks within a cluster.

For clustering the sub-networks into one or more clusters, the sub-networks can be modeled analogous to connected components in graph theory. For example, in a graph model of the sub-network, derived from the gene interaction network, the functionally related genes in the sub-network represent the vertices (nodes) of the graph and interaction between these functionally related genes is represented as undirected lines between the respective nodes of the graph.

The cluster C is then defined as a finite set of sub-networks of the form, $C=\{G'_1, G'_2, \ldots, G'_k\}$ wherein $G'_1, G'_2, \ldots, G'_k$ are a plurality of sub-networks. For example, the plurality of sub-networks belong to the gene interaction network G. Mathematically, any sub-network (sub graph) G' of larger interaction network G is a tuple <V', E'> such that $V' \subseteq V$, and $E' \subseteq E$, where V, V' represent a finite set of vertices (nodes) representing for example, genes or individuals in the network. G' is called induced sub-network if $\forall v_1, v_2 \in V'$, $(v_1, v_2) \in E \Leftrightarrow (v_1, v_2) \in E'$. Unless explicitly mentioned, the term sub-network is used for an induced sub-network. Two induced sub-networks are said to be equal if and only if they have the same set of vertices.

The FIG. 1 depicts the flow diagram 100 describing the clustering of the sub-network based on a user defined similarity coefficient according to an embodiment. As depicted in the flow diagram 100, at step 101, a plurality of initial clusters (clusters seeds) $C_1, C_2, \ldots C_n$ in a set S are created from the plurality of sub-networks $G'_1, G'_2, \ldots, G'_k$ of the gene interaction network G. Further, at step 102, a plurality of local priority queues (local heaps) and a global priority queue (global heap) are built from the clusters $C_1, C_2, \ldots C_n$. The local heap for each cluster $C_l$ in a set of clusters $S=\{C_1, C_2, \ldots, C_n\}$ is created that contains each cluster $C_k \neq C_l$ such that a computed link between cluster $C_k$ and the cluster $C_l$ is greater than a predefined cutoff value for the link ($link_{cutoff}$) so that $link(C_k, C_l) > link_{cutoff}$. The highest priority (top rank) is assigned to a cluster that has a highest link with $C_l$.

The link between two clusters $C_i$ and $C_j$ where the cluster $C_i = \{G^i_1, G^i_2, \ldots, G^i_m\}$ and the cluster $C_j = \{G^j_1, G^j_2, \ldots, G^j_n\}$ is computed as in equation 1 stated below:

$$\text{link}(C_i, C_j) = \frac{\sum_{G^i_k \in C_i, G^j_l \in C_j, G^i_k \neq G^j_l} rel(G^i_k, G^j_l)}{\text{normalize}(|C_i|, |C_j|)} \quad (1)$$

Where, 'rel' is a customized (user selected) functional relationship quantifier for computing the similarity coefficient defined by normalized coefficients. The clustering algorithm uses a multiplicative normalization function as stated in equation 2 below:

$$\text{normalize}(n_1, n_2) = n_1 \cdot n_2 \quad (2)$$

For example, n1 and n2 can be the number of sub-networks in the cluster $C_i$ and $C_j$ respectively.

For example, n1 and n2 can be the number of nodes within a sub-network when the clustering algorithm is applied for generation of sub-networks.

In an embodiment, gene expression p-value cut-off is used to determine whether the link between $C_k$ and $C_l$ exists.

If V is the set of genes in a gene interaction network then gene expression is a mapping given by E: $V \rightarrow R_{\geq 0}$, where $R_{\geq 0}$ is the set of positive real numbers. A higher value of gene expression indicates a more expressed gene. The gene expression p-value is a mapping such that, $E_p$: $V \rightarrow R_{\geq 0}$. A lower value of gene expression p-value indicates a more expressed gene.

The various functional relationship quantifiers used for computing a link using the rel ( ) function can be Jaccard Index, CNIC, EIC and the like.

Jaccard Index: For two sub-networks A and B, the Jaccard Index is defined as J (A, B)=|A∩B|÷|A∪B|, where | | represents cardinality of the argument.

CNIC: CNIC is based on Czekanowski-Dice (CD) interaction method, where the $0^{th}$ order interaction is defined as $c_0 = (|A \Delta B|) \div (|A| + |B|)$. Here, $\Delta$ represents symmetric difference.

$k^{th}$ order interaction is defined as:

$$c_k = |A_k \Delta B_k| \div (|A_k| + |B_k|)$$

where, $A_k$, $B_k$ are k hop neighbors of A and B

CNIC is then defined as in equation 3 below:

$$\Sigma_{i=0}^{k} w_i \div \Sigma_{i=0}^{k} CiWi \quad (3)$$

Where, $w_i$ is weight of the $i^{th}$ cluster.

EIC: Given two sub-networks G'=(V', E') and G"=(V", E"), the $0^{th}$ order interaction is defined as $e_0=|V' \cap V"|$. In the context of inter-gene interactions, it is logical to neglect edge interactions involving multiple intermediate nodes, because of the small world effect in biological networks. EIC is defined as in equation 4 below:

$$\hat{e}_1 = (w_0 \cdot e_0 + w_1 \cdot e_1 + w_1 \cdot e_2) \div (|V'|+|V"|) \quad (4)$$

where, $w_1$, $w_2$, $w_3$ are weights associated with the corresponding coefficients.

EIC is a simple interaction measure describing function binding between two sub-networks in terms of edge interaction. EIC leverages the fact that two gene sub-networks are functionally close if there are multiple interactions among the member genes of the sub-networks.

In contrast to EIC, CNIC is based on the idea that the interaction between two sub-networks is proportional to the number of common neighboring nodes. An increase in the value of both EIC, and CNIC indicate tighter interactions between the sub-graphs being compared.

The weight of the cluster $C=\{G'_1, G'_2, \ldots, G'_m\}$ is stated in equation 5 below:

$$w(C) = \frac{\sum_{G'_k \in C_i, G'_l \in C_j, G'_k \neq G'_l} rel(G'_k, G'_l)}{\text{normalize}(|C|)} \quad (5)$$

cluster sorted (ranked) with respect to its link with the highest ranked cluster (top cluster) in its local priority queue.

Further at step 103, the top cluster of the global heap is identified and popped out from the global heap. Further at step 104, the top cluster of the local heap is popped out of the local heap. Thereafter, at step 105, the two popped out clusters of the global heap and the local heap are merged to form a new cluster (intermediate cluster). The popped out clusters are deleted from the overall cluster list from each local heap and from the global heap. Further, at step 106, a local heap is built for the merged new cluster by computing (calculating) links between the new cluster and all existing clusters from the corresponding local heap and the global heap. Further, at step 107, a computed value of all the links is compared with the link$_{cutoff}$ value. If all the links are above the link$_{cutoff}$ then at step 108, the merged clusters within the new cluster are pushed back to their respective global heap and local heap. Further, the flow loops back to step 102. The global heap is updated accordingly by reconsidering the new cluster which is pushed back to the global heap. If at step 107, all the links are below the link$_{cutoff}$, then, at step 109, the new cluster is returned as a final cluster to a priority queue $F_q$. The priority queue $F_q$, sorted with respect to the weight of each cluster, is maintained to store the final clusters that are to be returned. The weight of the cluster is computed, e.g., as provided in equation 5 above. The clustering algorithm takes a minimum predefined size (for example, say k) of the global heap as an argument which determines the termination condition. The final clusters created contain similar sub-networks grouped together in a single cluster.

Further the flow loops back to step 102 to continue the clustering process with the remaining clusters to provide a plurality of clusters. Each formed cluster contains a plurality of similar sub-networks with similarity between the sub-networks within each cluster defined by the user defined customizable coefficient. The various actions in flow diagram 100 may be performed in the order presented, in a different order or simultaneously. Further, in some embodiments, some actions listed in FIG. 1 may be omitted.

Figures 2A, 2B:
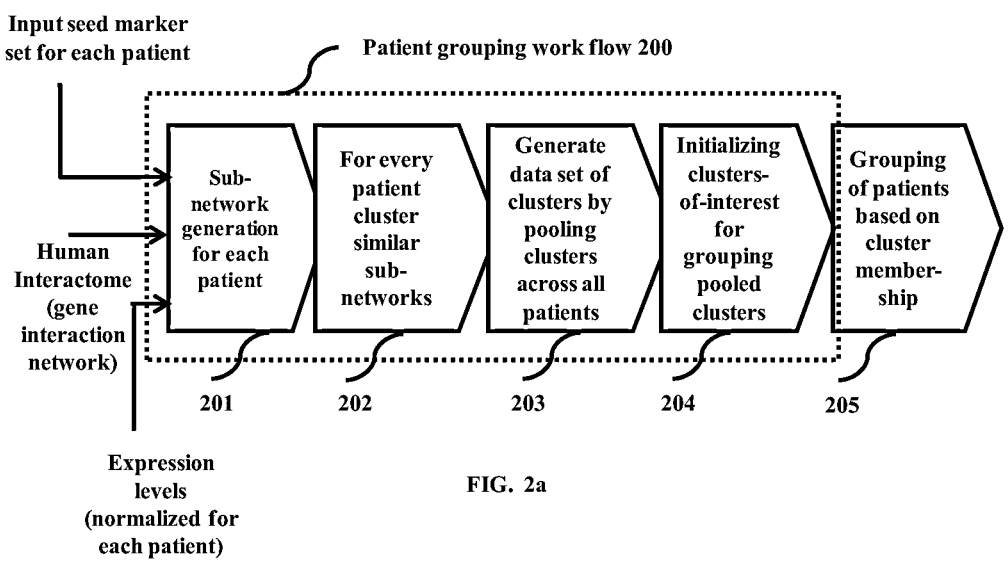
FIG. 2a illustrates an example workflow explaining patient grouping based on the enhanced hierarchical clustering algorithm and FIG. 2b illustrates experimental results of patient grouping provided by the enhanced clustering algorithm.

FIG. 2a illustrates an example workflow explaining patient grouping based on the enhanced hierarchical clustering algorithm and FIG. 2b illustrates experimental results of patient grouping provided by the clustering algorithm, according to embodiments as disclosed herein.

FIG. 2a depicts work-flow for grouping of patients for various applications such as patient stratification. The term patient does not limit to humans but is equally applicable to any living organism/tissue/cell-line of specified type. For every patient within the trial population, a set of input seed markers is identified. The input marker set is a set of potentially relevant genes identified for the patient using attributes such as gene expression levels and connectivity (for example, based on human interactome). For example, the input seed marker set can be extracted from the genes of the patient, from prior conducted experimental results, from the literature and similar sources.

The method does not require a complete data set of all relevant genes. Moreover, the method provides higher accuracy even with an incomplete list of relevant genes and/or presence of noise in data.

Further, at step 201, for every patient, the sub-networks are generated around the input seed markers using, e.g., the human interactome and gene expression levels normalized for each patient. The sub-network generation for each patient includes mapping every input marker within the input marker set, onto human interactome that provides an almost complete set of bio-molecular interactions within a cellular environment such as cellular protein-protein, protein-gene and gene-gene in humans. Further most differentially expressed markers in the neighborhood of each input marker are identified and the input marker gradually grows into a sub-network. Sub-network generation is further explained in FIG. 4 and FIG. 5 below. Thus, for each patient, a plurality of sub-networks are generated around the identified input seed marker set of that patient. For example, generating of sub-networks for a diseased patient corresponds to generation of the disease specific sub-networks based on a similarity coefficient such as Jaccard index, CNIC and other relevant thresholds to pool similar sub-networks.

Further at step 202, the sub-networks of each patient are pooled to identify and cluster similar sub-networks. For every patient, similar sub-networks are merged or clustered together in a single group called a cluster. A plurality of such clusters can exist for each patient. The user defined customizable similarity co-efficient provides the clustering criteria (similarity criteria) for grouping the similar sub-networks using the enhanced hierarchical clustering algorithm. This grouping provides augmented marker sets for each patient. Each group of clustered sub-networks provides a more consolidated group of sub-networks within the gene interaction network. Further, at step 203, clustered sub-networks across patients are pooled to generate data set of clusters across all patients. From this data set of clusters, certain clusters referred to here as clusters-of-interest are identified.

For example, based on the end application for which the patient stratification process the clusters-of-interest can be identified.

The clusters-of-interest are clusters that are discovered to have significance with respect to patient grouping for a specific end application. For example, the clusters-of-interest can be defined by a medical expert.

Thereafter, at step 204, the clusters-of-interest are initialized. Further pooled data set of clusters across patients is again clustered. The growing of clusters refers to grouping or clustering the pooled data set into groups defined by the clusters-of-interest. The growing of clusters-of-interest is based on the enhanced hierarchical clustering algorithm using the user defined customizable similarity coefficient.

Thereafter, at step 205, membership of each patient in each of clusters-of-interest is identified. The membership is determined based on the presence or absence of sub-networks of the patient in the clusters-of-interest. Further, the entire set of the patients within the trial population are grouped together based on their membership in clusters-of-interest. The grouping of patients in accordance with their membership is performed using a clustering method such as k-means, hierarchical clustering or the like. The various steps in work flow diagram 200 may be performed in the order presented, in a different order or simultaneously. Further, in some embodiments, some steps listed in FIG. 2*a* may be omitted.

The patients belonging to a particular group exhibit similar genetic characteristic. Thus, having knowledge of response of one patient to a particular drug enables a medical consultant to predict drug response of another patient falling in same group. This enables the medical consultant to avoid unnecessary administration of medication.

The ability to delineate drug responders from non-responders within the trial population (group of patients under consideration) in a consistent and predictable manner is one of the important factors in modern clinical trials relating to pharmacogenetic medicines. The drug response prediction is critical while treating patients with genetic diseases as these treatments can have severe side effects on the patient. For example, grouping of patients using the patient grouping workflow provides reliable patient stratification enabling a time efficient treatment for a patient by assisting selection of the most appropriate drug for the patient.

The FIG. 2*b* depicts experimental results of patient stratification process carried out on trial population of 23 lung adenocarcinoma patients. The table data indicates the method provides higher and consistent accuracy for patient stratification process for any selected combination of input marker sets, thus, providing higher reliability. As depicted in the figure, accuracy provided by the existing methods for patient stratification using same input marker set is comparatively low, hence less reliable.

Figure 3:
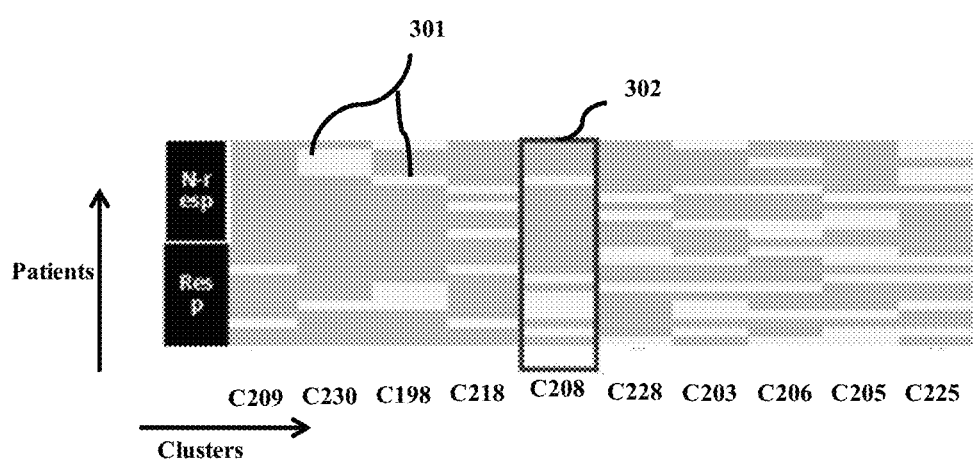
FIG. 3 illustrates an example result of the patient stratification process conducted on sample population of lung cancer patients.

FIG. 3 illustrates the example result of the patient stratification process conducted on a sample population of lung cancer patients, according to embodiments as disclosed herein. The figure depicts graphical analysis indicating patient membership across the clusters-of-interest. The graph depicts response and non-response lung cancer patient data with respect to a particular target drug. Vertical axis represents the patient population comprising responders and non-responders to the target drug. Horizontal axis represents plurality of clusters-of-interest. The blocks indicated by 301 indicate whether a particular patient is part of or a member of one or more clusters-of-interest C209, C230, and C198. The marked cluster 302(C208) indicates maximum number of responders and small number of non-responders to the target drug. Thus, the results assist the medical consultant to stratify patients before administering the target drug. The results enable the medical consultant to administer the drug to only those patients which are most likely to respond to the drug. Whether a patient is a responder to the target drug can be predicted by identifying if the patient has the membership within cluster C208.

The cancer patient data in the above analysis is an example. The method is equally applicable to stratify patients for any particular selected drug such as a target antibiotic. The drug response prediction in patient stratification assists the medical consultant to choose the most effective drug resulting in faster recovery of the patient.

Figure 4:
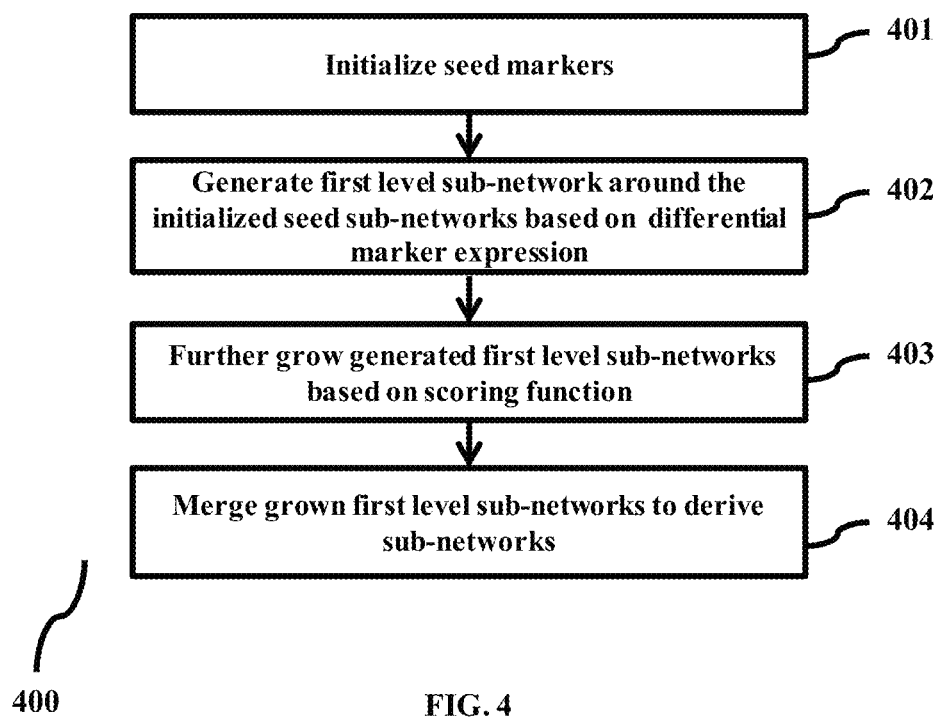
FIG. 4 illustrates a flow diagram explaining generation of sub-networks from a larger gene interaction network.

FIG. 4 illustrates a flow diagram explaining generation of sub-networks from a larger gene interaction network, according to embodiments as disclosed herein. As depicted in the flow diagram 400, at step 401, the seed markers for sub-network generation are initialized. The seed markers correspond to set of selected markers that are deemed most important in the context for which the patient grouping is applied.

In an embodiment the seed markers can be selected by data mining the literature or from prior conducted experiments.

In an embodiment, most differentially expressed markers can be selected as seed markers.

In an embodiment, the set of seed markers can be a combination of markers identified from literature and most differentially expressed markers.

Further, at step 402, first level sub-networks are generated around each seed marker based on expression by identifying differentially expressed markers in the neighborhood. A detailed description for generation of the first level sub-networks is provided in FIG. 5. Once the first level sub-networks are generated, at step 403, the first level sub-networks are further grown using term enrichment of an iterative scoring function.

For example, the scoring function can be a Fisher's scoring function which is defined in the literature as the first derivative of a log likelihood function. Further the scoring function for each first level sub-network is computed based on a predefined scoring function such as the Fisher's scoring function.

For example the predefined scoring function for the gene interaction network G having n genes computed with respect a sub network G' having m genes is computed using equation 6 below.

$$\text{Score}(G/G') = f(n, n', n'', m, m', m'') \tag{6}$$

Where, n' and n" are number of focus genes and privileged respectively among n genes of gene interaction network G and m' and m" are number of focus genes and privileged genes respectively among m genes of sub-network G'.

For example, top expressed genes in the gene interaction network are referred as the focus genes. The genes are ranked with respect to their gene expression values in a descending order or with respect to their expression p-values in an ascending order. The expression value or expression p-value cutoff is specified and top genes are selected as the focus genes that meet the p-value cutoff.

The privileged genes are genes that are selected from the whole gene interaction network by biologists or experts. These are genes that are particularly related to some disease or drug response. The privileged genes are independent of focus genes.

For the Fisher's scoring function the equation 6 modifies to equation 7 below:

$$\text{score}\left(\frac{G}{G'}\right) = \frac{\left\{\binom{n'}{m'} \times \binom{n-n'}{m-m'}\right\}}{\binom{n}{m}} \quad (7)$$

including n genes with 'n' focus genes and 'n' privileged genes

Further, each first level sub-network is grown by merging with the best neighboring differentially expressed marker such that the score (scoring function) of the resulting grown sub-network is superior to the earlier computed score of the first level sub-network prior to merging with the neighboring differentially expressed marker.

Thereafter, at step 404, the grown first level sub-networks are further merged to derive the sub-networks. A pre-defined upper cut-off limit is set, which restricts size of the sub-networks. The upper cut-off limit prevents creating very large sub-networks beyond a predefined threshold as very large sub-networks may not have any significance with respect to similarity or drug response. The method facilitates generation of sub-networks that are relevant with respect to differential marker expressions. Unlike the existing gene expression based network generation techniques, the method provided enables generating sub-networks each satisfying specific size criteria. The various actions in flow diagram 400 may be performed in the order presented, in a different order or simultaneously. Further, in some embodiments, some actions listed in FIG. 4 may be omitted.

The method describes generation of sub-network with reference to a gene interaction network. However, sub-network generation within any larger network equally applies to any other network where relations among entities of the network can be expressed differentially. For example, messaging between members of social network may normally be estimated to a certain number. Any sudden increase or decrease in the messaging, if it can be expressed by a metrics proportional to the change occurred can be identified as differentially expressed members analogous to differentially expressed markers.

The method provides multiple embodiments to be used for merging of the grown first level sub-networks based on the scoring function or the clustering algorithm. The merging of the grown sub-networks is described in detail in FIG. 6.

Figure 5:
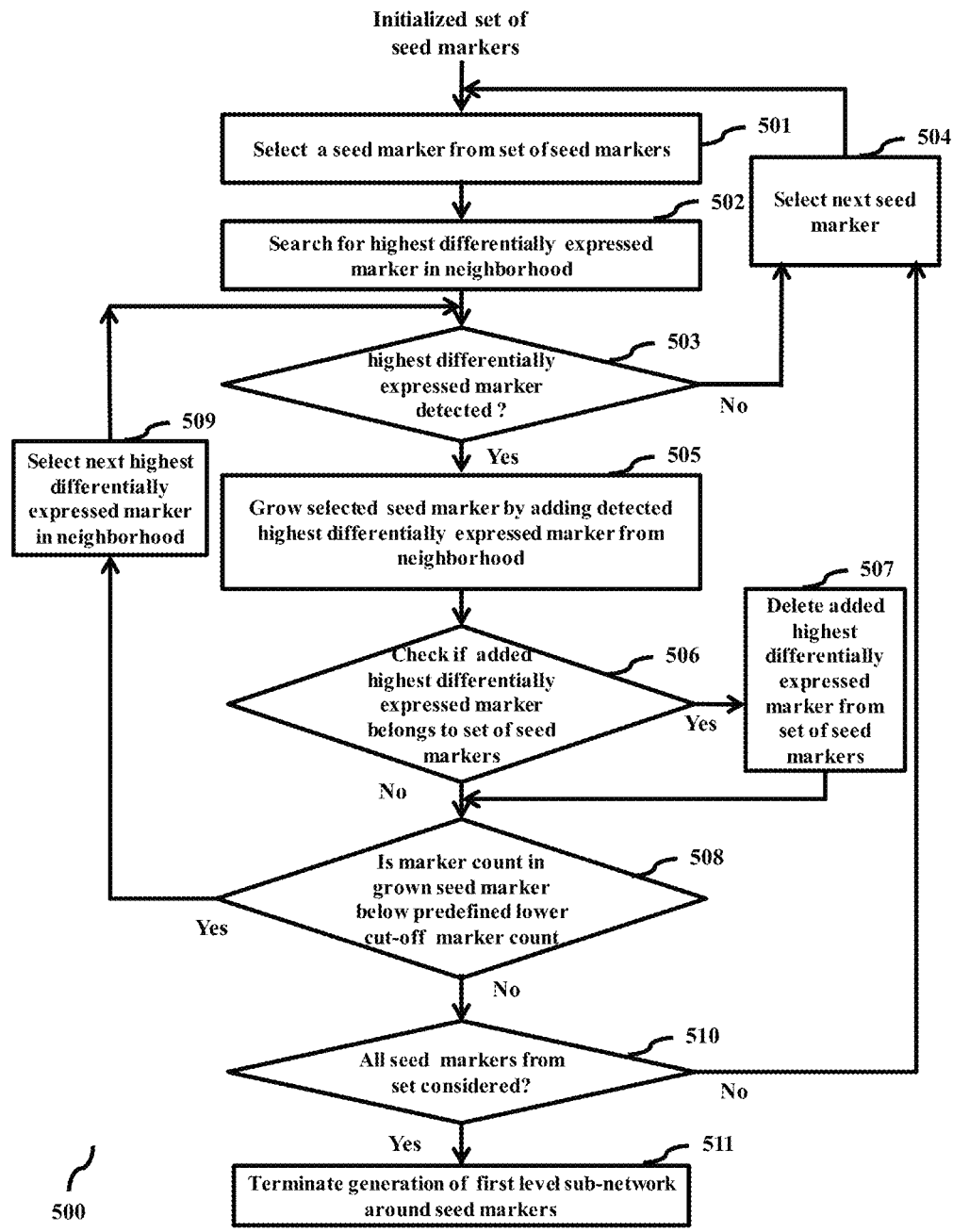
FIG. 5 illustrates a flow diagram explaining expression based generation of first level sub-networks of differentially expressed markers.

FIG. 5 illustrates a flow diagram explaining a method 500 of expression based generation of the first level sub-networks of differentially expressed markers, according to embodiments as disclosed herein. As depicted in the FIG. 5, at step 501, one of the seed markers k from a set of initialized set of seed markers is selected. The selected seed marker is then mapped on the human interactome or the gene expression data base. Further, at step 502, a highest differentially expressed marker in an immediate neighborhood of the selected seed marker is determined.

In an embodiment, the highest differentially expressed marker in a neighborhood is determined based on a gene expression p-value.

In an embodiment, the neighborhood can be determined based on a z-score or any other metric that captures differential expression proportional to the differential expression expressed by the marker.

Thereafter, at step 503, if the highest differentially expressed marker is not detected, then at step 504, the next seed marker from the set of initialized seed marker is selected and flow loops back to step 501. Further, at step 505, the selected seed markers is grown by adding the detected highest differentially expressed marker to the seed marker. Further, at step 506, if the added highest differentially expressed marker belongs to a set of seed markers, then, at step 507, the set of seed markers is updated. The updating includes deletion of the currently added highest differentially expressed marker from set of seed markers. This step provided by the method ensures that every added highest differentially expressed marker is included in only one of the first level sub-networks being generated.

Further, at step 508, if the marker count in the growing seed marker set is below a predefined lower cut-off marker count, then at step 509, the next highest differentially expressed marker in the neighborhood of the grown seed marker is selected. Further, the method loops back to step 503 and continues further growing of the seed markers.

If at step 508, the marker count in the growing set of seed markers is above the predefined lower cut-off marker count and if at step 510, all seed markers from the set have not been considered for generating first level sub-networks, then the method loops back to step 504. At step 504, the next seed sub-network is selected and the flow loop backs to step 501.

If all seed markers from the set have been considered, then, at step 511 the generation of first level sub-networks is terminated. The various actions in flow diagram 500 may be performed in the order presented, in a different order or simultaneously. Further, in some embodiments, some actions listed in FIG. 5 may be omitted.

These generated first level sub-networks are then processed to further grow the first level sub-networks using a scoring function as described at step 403 of FIG. 4.

Figure 6:
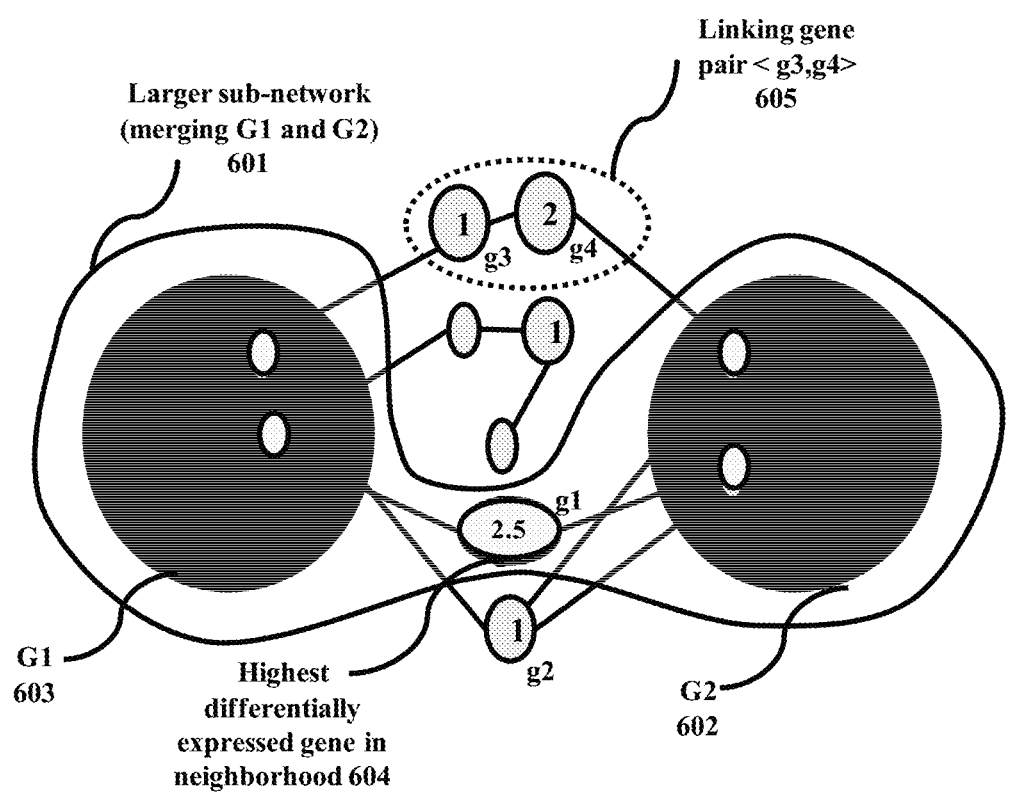
FIG. 6 illustrates an example larger sub-network created by merging grown first level sub networks with a highest differentially expressed gene in neighborhood.

FIG. 6 illustrates an example of a larger sub-network created by merging grown first level sub networks with a highest differentially expressed gene in neighborhood, according to the embodiments as disclosed herein. The figure depicts the larger sub-network 601 created by merging two completely grown sub-networks G1 602 and G2 603 respectively. The two sub-networks G1 602 and G2 603 are merged with the highest differentially expressed marker 604 in the neighborhood. The differential marker expression value for the selected expressed marker is 2.5 as compared to differential marker expression value of other markers in the neighborhood such as values 1 and 2. The highest differentially expressed marker in the neighborhood directly connects to the sub-networks G1 602 and G2 603 respectively. Unlike existing methods that merge sub-networks, the method uses differential marker expression instead of edge or connection count.

For example, the differentially expressed marker or marker pair can be a differentially expressed gene or gene pair.

For example, for any direct linking genes g1 and g2 as depicted in figure, being candidates for merging two sub-networks $G_1$ and $G_2$ through direct connection, g1 is considered over g2 if differential expression of g1 is greater than differential expression of g2 ($E(g_1) > E(g_2)$). For example, with the differential expression using p-value, gene g1 is selected over gene g2 if $E_p(g1) < E_p(g2)$.

If the genes g1 and g2 have same expression values then the method randomly chooses the gene around which the two sub-networks g1 and g2 are to be merged.

In an embodiment, the method merges two sub-networks to form the larger sub-network based on based on linking gene pairs such as linking gene-pairs <g3,g4> 605 between the two sub-networks G1 602 and G2 603. For example, for merging sub-networks G1 602 and G2 603 over linking gene pair <g3,g4> 605 and any other existing link pair <g1',g2'>, the linking pair <g3,g4> 605 is selected if:

$$f(E(g3),E(g4)) > f(E(g1'),E(g2'))\ or$$

$$f(E_p(g3),E_p(g4)) < f(E_p(g1'),E_p(g2'))$$

Where, f is a function of the form f: R×R→R and R being a set of positive real numbers.

The pair is randomly chosen if both f(E(g3), E(g4)) and f(E(g1'), E(g2')) are equal or f($E_p$(g3), $E_p$(g4)) and f($E_p$(g1'), $E_p$(g2')) are equal.

The method enables defining priority between choosing a single marker merging option or a marker pair merging option, in case candidates for both types exist. The priority is determined subject to the requirements.

The method enables merging of sub-networks that may be connected through multiple hops. The number of hops to be considered can be predefined.

In an embodiment, the method provides a generalized framework for merging two sub-networks with respect to the scoring function. An order of merging specified by an integer value is selected. The order selected specifies the number of directly linked markers between two sub-networks to be merged. If there are k direct linking markers between sub-network A, and sub-network B, and k' is the order of merging then $^kC_{k'}$ subsets of size k' can be selected. A subset from $^kC_{k'}$ subsets is chosen to merge A and B, that optimizes score of the resultant sub-network.

In an embodiment, the method provides merging of two sub-networks with respect to the scoring function. If k direct linking markers exist between sub-network A, and sub-network B, then all $2^k$ subsets from the k markers are selected. Further the subset from $2^k$ subsets is chosen to merge A and B such that, it optimizes score of the resultant sub-network.

In an embodiment the method merges the grown first level sub-networks using the clustering algorithm.

Figure 7:
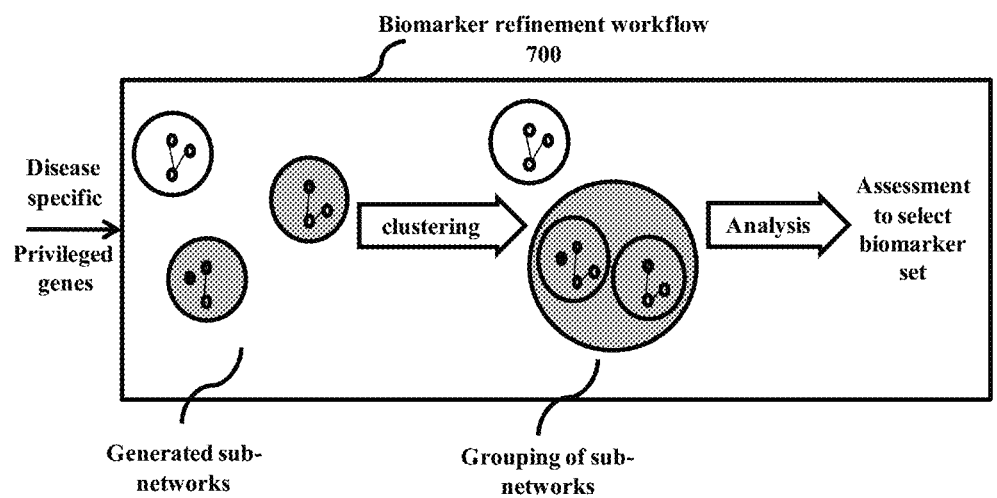
FIG. 7 illustrates the workflow explaining the biomarker refinement.

FIG. 7 illustrates a workflow explaining the biomarker refinement, according to embodiments as disclosed herein. The figure depicts the clustering algorithm having been used for detecting new biomarkers. Given an incomplete set of disease specific privileged genes, used as the input marker se,t the sub-networks can be generated as described in FIG. 4 and FIG. 5. These generated sub-networks are grouped together using the clustering algorithm based on the user defined customized similarity coefficient.

The clustering of sub-networks based on customizable similarity coefficient as opposed to existing Boolean matching of sub-networks groups enables refinement or selection of biomarkers (clinical markers). For example, refinement of the biomarkers comprises identifying one or more differentially expressed gene in the gene interaction network which interact with the highly expressed part of the gene interaction network. The customizable similarity coefficient based clustering enables determining such interactions of the sub-network from the gene interaction network. For example, such differentially expressed gene (biomarker) can be a potentially important gene playing a critical role in cancer development in a living organism. The method enables refinement of such biomarkers by clustering the biomarkers along with the sub-networks with whom they interact. Analysis of the created clusters subsequently enables identification of new biomarkers. The various actions in workflow diagram 700 may be performed in the order presented, in a different order or simultaneously. Further, in some embodiments, some actions listed in FIG. 7 may be omitted.

In an embodiment, specific scoring functions can be defined for the identified sub-networks to choose privileged biomarkers.

Figure 8:
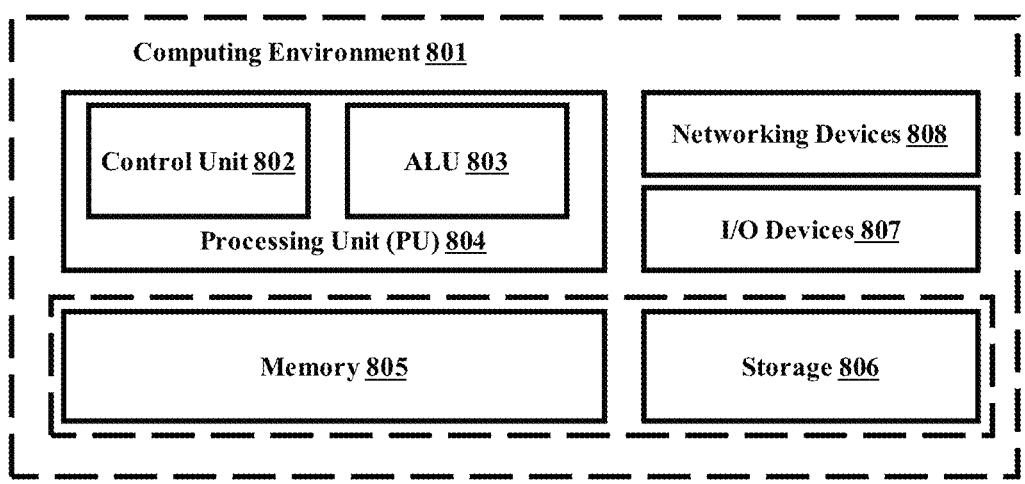
FIG. 8 illustrates the computing environment implementing a method of clustering plurality of sub-networks of a larger network using the enhanced hierarchical clustering method.

FIG. 8 illustrates a computing environment implementing a method and system to cluster a plurality of sub-networks of the larger network using the enhanced hierarchical clustering algorithm, according to the embodiments herein. As depicted the computing environment 801 comprises at least one processing unit 804 that is equipped with a control unit 802 and an Arithmetic Logic Unit (ALU) 803, a memory 805, a storage unit 806, plurality of networking devices 808 and a one or more Input output (I/O) devices 807. The processing unit 804 is responsible for processing the instructions of the algorithm. The processing unit 804 receives commands from the control unit in order to perform its processing. Further, any logical and arithmetic operations involved in the execution of the instructions are computed with the help of the ALU 803.

The overall computing environment 801 can be composed of multiple homogeneous and/or heterogeneous cores, multiple CPUs of different kinds, special media and other accelerators. The processing unit 804 is responsible for processing the instructions of the algorithm. Further, the plurality of processing units 804 may be located on a single chip or over multiple chips.

The algorithm comprising of instructions and codes required for the implementation are stored in either the memory unit 805 or the storage 806 or both. At the time of execution, the instructions may be fetched from the corresponding memory 805 and/or storage 806, and executed by the processing unit 804.

In case of any hardware implementations various networking devices 808 or external I/O devices 807 may be connected to the computing environment to support the implementation through the networking unit and the I/O device unit.

The embodiments disclosed herein can be implemented through at least one software program running on at least one hardware device and performing network management functions to control the elements. The elements shown in FIG. 8 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for clustering a plurality of sub-networks comprising:
   receiving as input in a computing device, one or more expression data sets of one or more samples;
   preprocessing the input expression data for obtaining a plurality of seed markers; wherein the seed markers are biomarkers or input marker genes, and obtained by methods such but not limited to thresholding normalized expression data based on a predefined threshold value;

extracting a set of sub-networks for the input samples using expression values, set of seed markers obtained as above and the interaction network;

selecting sub networks among the plurality of the extracted or input sub-networks;

building a plurality of local heaps for each cluster among a plurality of clusters by computing a first link between each cluster and remaining clusters of the plurality of clusters, wherein each of the plurality of clusters correspond to the selected sub-networks;

building a global heap by computing a second link between each cluster among the plurality of clusters and a highest ranked cluster of each of the local heap among the plurality of local heaps;

merging the highest ranked cluster of each local heap and a highest ranked cluster of the global heap to form a plurality of intermediate clusters;

calculating a similarity coefficient between each intermediate cluster among the plurality of intermediate clusters and each cluster in the global heap and each cluster corresponding to one of the local heap; and returning each intermediate cluster as a final cluster, if each the calculated similarity coefficients are below a predefined link cutoff value.

2. The method as in claim 1, wherein a value of the link is based on a user defined customizable similarity coefficient used for computing a functional relationship quantifier.

3. The method as in claim 1, wherein the method further comprises pushing the each intermediate cluster into the global heap if the calculated link is above a predefined link cutoff value.

4. The method as in claim 1, wherein the method comprises building the local heap for the each cluster by adding each cluster from the remaining clusters to each local heap if the computed link for the cluster is above a predefined link cutoff value.

5. The method as in claim 1, wherein the method comprises ranking at least one cluster in each local heap and at least one cluster in the global heap to determine the highest ranked cluster in each local heap and the highest ranked cluster in the global heap based on a value of the computed link for the at least one cluster in the each local heap and the at least one cluster in the global heap.

6. The method as in claim 1, wherein the method further comprises performing grouping based on the enhanced hierarchical clustering algorithm by:

generating the plurality of sub-networks for each sample among a plurality of samples;

clustering sub-networks within the plurality of sub-networks of each sample using the enhanced hierarchical clustering algorithm based on the customizable similarity coefficient; and generating a data set of clusters by pooling clusters across the plurality of samples.

7. The method as in claim 5, wherein the method further comprises:

initializing a plurality of clusters-of-interest from the data set of clusters;

growing the clusters-of-interest using the data set of clusters;

determining membership of each sample in each the plurality of cluster-of-interest based on the clustered sub-networks for the each sample; and grouping the plurality of samples into a group among a plurality of groups based on the determined membership of the sample, wherein samples in the group exhibit identical cluster memberships.

8. The method as in claim 5, wherein the method further comprises generating the plurality of sub-networks by:

generating a set of first level sub-networks around a plurality of seed markers based on differential marker expression;

growing the set of generated first level sub-networks based on a predefined scoring function; wherein the predefined scoring function is defined as but not limited to the first derivative of a log likelihood function, and merging the set of grown first level sub-networks based on one of: the enhanced clustering algorithm and a predefined similarity coefficient to generate the plurality of sub-networks; and merging of the sub-networks using a highest differentially expressed marker in a neighborhood.

9. The method as in claim 6, wherein the similarity coefficient can be based on similarity measures such as but not limited to Jaccard coefficient, Edge interaction coefficient (EIC) and Common neighborhood interaction coefficient (CNIC).

10. A device for clustering a plurality of sub-networks derived from a larger network using an enhanced hierarchical clustering algorithm, wherein the device comprises:

an integrated circuit further comprising at least one processor;

at least one memory having a computer program code within the circuit;

the at least one memory and the computer program code with the at least one processor cause the device, when the computer program code is executed by the processor, to:

receive a data set representing a plurality of sub-networks derived from a network;

select sub networks among the plurality of sub-networks;

build a plurality of local heaps for each cluster among a plurality of clusters by computing a first link between each cluster and remaining clusters of the plurality of clusters, wherein the plurality of clusters correspond to a plurality of selected sub-networks among the plurality of sub-networks;

build a global heap by computing a second link between each cluster among the plurality of clusters and a highest ranked cluster of each the local heap among the plurality of local heaps;

merge the highest ranked cluster of each local heap and a highest ranked cluster of the global heap to form a plurality of intermediate clusters;

calculate a similarity coefficient between each intermediate cluster among the plurality of intermediate clusters and each cluster in the global heap, each cluster corresponding to one of the local heap; and return each intermediate cluster as a final cluster, if each the calculated link is below a predefined link cutoff value.

11. The device as in claim 10, wherein a value of the link is based on a user defined customizable similarity coefficient used for computing a functional relationship quantifier.

12. The device as in claim 10, wherein the device is further configured to push each intermediate cluster into the global heap if each the calculated link is above the predefined link cutoff value.

13. The device as in claim 10, wherein the device is configured to build the local heap for the each cluster by adding each cluster from the remaining clusters to each local heap if the computed link for the cluster is above the predefined link cutoff value.

14. The device as in claim 10, wherein the device is configured to rank at least one cluster in each local heap and at least one cluster in the global heap to determine the highest ranked cluster in each local heap and the highest ranked cluster in the global heap based on a value of the computed link for the at least one cluster in each local heap and the at least one cluster in the global heap.

15. The device as in claim 10, wherein the device is further configured to perform patient grouping based on the enhanced hierarchical clustering algorithm by:
generating the plurality of sub-networks for each patient among a plurality of patients;
clustering sub-networks within the plurality of sub-networks of each patient using the enhanced hierarchical clustering algorithm based on the customizable similarity coefficient; and
generating a data set of clusters by pooling clusters across the plurality of patients.

16. The device as in claim 15, wherein the device is further configured to:
initialize a plurality of clusters-of-interest from the data set of clusters;
grow the clusters-of-interest using the data set of clusters;
determine membership of the each patient in each the plurality of cluster-of-interest based on the clustered sub-networks for the each patient; and
group the plurality of patients into a group among a plurality of groups based on the determined membership of the each patient, wherein patients in the group exhibit identical cluster membership.

17. The device as in claim 15, wherein the device is further configured to generate the plurality of sub-networks by:
generating a set of first level sub-network around a plurality of seed markers based on differential marker expression;
growing the set of generated first level sub-networks based on a predefined scoring function; and
merging the set of grown first level sub-networks based on one of: the enhanced hierarchical clustering algorithm and the predefined scoring function to generate the plurality of sub-networks, wherein the predefined scoring function is defined as the first derivative of a log likelihood function.

18. The device as in claim 10, wherein the device is further configured to refine at least one biomarker by clustering sub-networks generated from an incomplete set of disease specific input marker genes, wherein the clustering is based on a customizable similarity coefficient.

19. A computer program that is implemented by hardware and is stored in a medium to execute the method of claim 1.

* * * * *